Energy Level Transitions

INVENTOR
Norman F. Fyler
By Alan C. Rose
Attorney

United States Patent Office 3,431,511
Patented Mar. 4, 1969

3,431,511
OPTICAL MASER APPARATUS
WITH PUMP TRIGGER
Norman F. Fyler, Menlo Park, Calif., assignor to Litton
Precision Products, Inc., a corporation of Delaware
Continuation-in-part of application Ser. No. 127,983,
July 31, 1961. This application Jan. 8, 1962, Ser. No.
164,953
U.S. Cl. 331—94.5                                   3 Claims
Int. Cl. H01s 3/18; H01j 1/62, 63/04

This invention relates to "optical masers" which are also called "lasers."

This application is a continuation-in-part of patent application Ser. No. 127,983, of Norman F. Fyler, which is entitled "Optical Maser" and which was filed on July 31, 1961.

The term "maser" stands for "microwave amplification by stimulated emission of radiation." The term "laser" is patterned after the "maser" designation and stands for "light wave amplification by stimulated emission of radiation." The term "laser" is normally applied to oscillators as well as amplifiers, operating in the visible, ultraviolet or infrared frequency spectra.

Optical masers, or lasers, are new devices which are believed to herald a new era in the realm of applications for electromagnetic radiations in the optical frequency range. The nature of the devices which have been operated up to the present time and some of the probable fields of application are discussed in some detail in a recent article which appeared at pp. 52 through 61 of the June 1961 issue of Scientific American. The article was entitled "Optical Masers" and was written by Arthur L. Schawlow of the Bell Telephone Laboratories.

In brief, the optical maser or laser produces coherent light, in contrast to the noise saturated light sources of the past. Thus, in the case of incandescent light sources or gaseous discharges, the light is produced by the random generation of photons, without any synchronism between the time of emission of the photons. In laser action, however, the light is emitted by transistions from one energy state of an atom or molecule to another energy state. Furthermore, these energy transitions are synchronized by controlling or stimulating the transitions from one energy state to another. In a properly operating laser, a preponderance of the emitted light occurs in a single coherent phase as large numbers of atoms or molecules jump from a higher energy state to a lower energy state in synchronism. One of the surprising things about laser phenomena is the synchronism of energy transitions which are triggered by photons from adjacent energy transitions.

For scientifically trained persons, potential applications of a coherent light source are boundless. Thus, to give one example from Mr. Schawlow's article, a single laser, if operated in the manner of a conventional modulated radio frequency generator, could carry all of the information which is currently carried by all of the radio communication channels now in operation throughout the world.

The known embodiments of the laser principle, however, suffer from many difficulties. These include, for example, insufficient intensity of the light source which is employed to raise the atoms to their excited state, undesired diffusion or dispersion of the output light from the laser, significant difficulties in cooling the active elements of the device, and low efficiencies in the conversion of electrical into light energy. The principal objects of the present invention involve the elimination or reduction of these problems.

In accordance with one aspect of the present invention, many of these difficulties may be overcome through the use of a laser apparatus employing, as its active element, a bundle of fiber optic filaments.

In another aspect, the invention contemplates excitation of the active laser components by an intense light source provided by a cathode ray tube screen energized by an intense broad area electron beam, or other suitable radiation source.

In accordance with another aspect of the invention, cooling is provided for the laser elements by the flow of a liquid coolant and, when fiber optic laser elements are employed, the fiber optic strands are arranged to permit the flow of coolant adjacent each individual strand. In addition to reducing the ambient temperature of the laser, the coolant may keep the temperature of the phosphor screen at a moderate level.

Another aspect of the invention invloves the application of a part of the output energy back into the fiber optic system, through the use of a fiber optic cable in which one end is bent around to direct light toward the other end of the cable. Such a reentrant structure provides feedback and also permits amplification when additional light is supplied to the input fiber optic channel.

The problems of low efficiencies and the resultant overheating in present day lasers will now be considered. Initially, most lasers are energized by commercially available xenon lamps. These lamps have a broad output spectrum which is essentially white light. However, only a very restricted band of frequencies are useful in "pumping" the laser material to the higher energy states necessary for proper radiation. The remainder of the energy poured into excitation of the xenon lamp is wasted and much of it is converted into heat. As described at pp. 1635 et seq., of the November 1961 issue of the Proceedings of the Institute of Radio Engineers, in an article by P. P. Kisliuk and W. S. Boyle, laser action is greatly impaired by heat. When broad spectrum pump light sources are used, therefore, laser efficiency, amplification and other figures of merit are significantly reduced.

The application of light frequencies other than those useful in pumping the laser material to elevated energy states has other disadvantages in addition to reducing the efficiency and increasing the heating of the laser element. Thus, for example, when the applied light includes frequencies in the normal output band of the laser material, erratic additional radiations at this frequency will be produced. These radiations have the undesired effect of depopulating the high energy states prior to the desired output pulse and of increasing the noise level of the device.

Further objects of the present invention, therefore, include increasing the efficiency of the laser material and avoiding the application of undesired and unneeded light to the laser element.

In accordance with one aspect of the invention, increased efficiencies may be obtained by careful matching of the light source to the desired input characteristic of the laser. Thus, the optical pump should supply the required frequencies for excitation of the laser material, and no other frequencies. This may advantageously be accomplished by the use of a phosphor having its characteristic matched to the desired input of the laser. The phosphor may be energized by radiations of many forms including electrons, light radiations, or radioactive particles, for specific examples. In view of the high response of many phosphors to ultraviolet light, and the high energy content of the high frequency ultraviolet light, a low pressure mercury arc is a particularly suitable source for energization of the phosphor material. In some cases, however, combinations of various illumination sources are useful in energizing the laser material. For specific example, a phosphor energized by a mercury plasma may provide threshold illumination, and may be used in combination with a phosphor energized by electrons which provides accurately-timed higher intensity illumination to trigger the output signals. The phosphor may also suitably be mixed with coolant liquid in a slurry and used in this form to irradiate the laser material.

Gas plasmas characteristically have an output spectrum which is dependent on their pressure and level of excitation. Under low pressure conditions, gaseous plasmas exhibit sharply-defined spectral lines. In the case of mercury, its output radiation at low pressure is in the ultraviolet range. At higher pressures and stronger excitations, the spectrum of gas lamps become more nearly uniform, and radiation occurs throughout the greater portion of the light spectrum. The white light output of commercial high pressure xenon lamps is typical of this phenomenon. For high efficiencies, however, it is desirable that the gas plasmas be operated in their low pressure states so that only the desired output spectral lines are present, and radiation is not wasted throughout the light spectrum. Thus, low pressure mercury vapor may be employed to excite phosphor material which is matched to the desired input spectrum of the particular laser material which is employed. Similarly, low pressure sodium vapor may be employed to excite a ruby laser directly. Other low pressure gas plasmas may also be matched to the required spectral input of the laser material which is being employed.

In accordance with a feature of the invention, a laser apparatus including phosphor material for exciting the laser material may be provided with arrangements, such as a filter, located outside the phosphor between the phosphor and its energizing source. The filter freely transmits light or radiation of the frequency required for energization of the phosphor, but reflects light at the radiating frequency of the phosphor. With this arrangement, no undesired light impinges on the laser material to heat it up or increase its noise level, and the output light from the phosphor is reflected from the filter to increase the irradiation of the laser element in the proper frequency band.

Certain advantages of phosphors for the irradiation of laser elements will now be considered. First, techniques for preparing phosphors having any desired output spectral distribution are well known. This is in contrast to the broad spectral distribution of high pressure gas plasmas, and the fixed spectral lines and relatively low light intensities of low pressure gas plasma. Accordingly, phosphors may be readily prepared to have a light output which matches the excitation requirements of any of the many known laser materials. In addition, it is often desirable to excite gas plasmas at radio frequencies, as discussed below. The light output of a gas plasma will then vary in a substantially sinusoidal manner. When a phosphor layer is interposed between the gas plasma and the laser material, however, the persistence or time delay of the phosphor provides a continuous light output for energization of the laser.

Other objects, features and advantages will become apparent in the course of the following description of certain specific embodiments of the invention.

Figure 1:
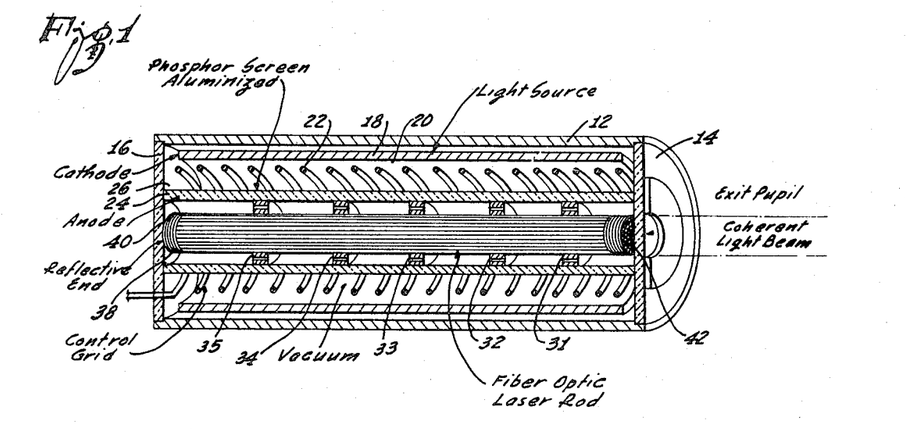
FIG. 1 shows a laser device in accordance with the present invention.

With reference to FIG. 1, a vacuum tube is provided which has an outer vacuum sealed envelope including the cylindrical casing 12 and two end plates 14 and 16. Within the outer casing 12 is a concentric cylindrical cathode 18. It has an emissive surface 20 and is provided with heating wires of high resistance material (not shown). In operation, the inner surface 20 of the cathode 18 is heated to red heat, corresponding to a temperature of approximately 850 to 900 degrees centigrade. Within the cathode 18 a control grid 22, which is in the form of a helical wire, may be provided. Additional supporting wires may be provided which extend in a longitudinal direction to give greater rigidity to the control grid structure.

An inner cylinder 24 of high temperature resistant glass, such as quartz or the like, is mounted concentrically with the grid and the cathode toward the center of the unit. The outer surface of the glass cylinder 24 is provided with an aluminized phosphor coating 26 having a predetermined spectral distribution of its light output as discussed below. The term aluminized phosphor coating conventionally denotes the application of a thin layer of electron permeable and light reflective aluminum on a phosphor layer; see Zworykin and Morten, Television, second edition, 1954. It is contemplated that electron current densities of 5, 10 or even more than 40 amperes per square centimeter may be supplied to the coating 26. The aluminized coating constitutes the anode electrode, and may be maintained at positive potentials of several thousand or more than 10 or 20 thousand volts.

The active laser element 28 is located in the center of the vacuum tube structure. It is made up of a bundle of fiber optic rods. Suitable support rings 31 through 35 may be provided between the glass cylinder 24 and the bundle of fiber optic rods 28. In one known form the substance employed in the fiber optic rods 28 may be pink ruby material. This material, which has been employed in previous laser devices, is aluminum oxide with some of the aluminum atoms being replaced in the crystal lattice by chromium atoms. It is sometimes called "chromium-doped" aluminum oxide. Other known laser material may be employed; specifically, calcium fluoride crystals with samarium or uranium doping may be used.

It may also be noted that the outer construction as shown in the structure of FIG. 1 may be employed with a gaseous or other laser structure and is not limited in its applicability to the fiber optic arrangement.

The space between the rods 28 and the cylinder 24 may be part of the vacuum chamber. However, as discussed in detail below, it is preferable that this area be employed for coolant flow. Specifically, liquid nitrogen or other similar coolants may be transmitted through the space between the glass cylinder 24 and the fiber optic rods 28. The rings 31 through 35 may have axial openings to permit the flow of coolant. However, the presence of the rings tends to force the coolant through the interstices in the fiber optic rod structure 28 and cool it internally. In addition, the liquid nitrogen maintains the inner cylinder 24 at a sufficiently low temperature that the phosphor coating 26 is not destroyed by the intense thermal radiation from the red hot cathode 18.

Many of the optical masers which have been proposed heretofore have employed a pair of mirrors to obtain alignment of the radiations and reinforcement of the maser action, as light build-up is produced. In the present device, the left hand end of the fiber optic bundle 28 is bonded to form an integral body 38 and the extreme end 40 of the fiber optic bundle 28 is ground, polished and silvered to provide a fully reflecting surface. The exit pupil 42 may be partially silvered in accordance with prior art proposals. However, in a preferred embodiment of the invention, it need not be silvered as sufficient energy build-up will be obtained by one or two transits through the fiber optic rods. To obtain this action, the units may be moderately long, and units which are three or four feet long, for example, may be used.

As compared with prior art proposals in which a single crystal was employed, the fiber optic structure of FIG. 1 has a number of advantages. Thus, for example, a particular disadvantage of the large crystal device involves the imperfections which are present in the larger crystals. This prevents the desired rapid and efficient build-up of laser action.

In accordance with the present invention, however, the monocrystalline fiber optic filaments may be inspected and any defective filaments may be deleted. In addition, because the crystals which have been used heretofore have had such a large cross sectional dimension, fibrations in many modes, a phenomenon known as multimoding, occurs. This has the undesired effect of diffusing the light output and produces a tendency toward incoherent light. The dimensions of the fibers in the active laser element 28 of FIG. 1, however, are sufficiently small that they will only sustain a relatively few wave lengths in the transverse direction; accordingly, oscillation in other than one dominant mode will be suppressed and the undesired tendency toward incoherence and light diffusion will be eliminated. It is contemplated that the fibers may be 5 microns in diameter. The fibers are of high index of refraction (about 1.70) and the surrounding medium has a relatively low index of refraction so that true fiber optic characteristics are obtained.

Figure 2:
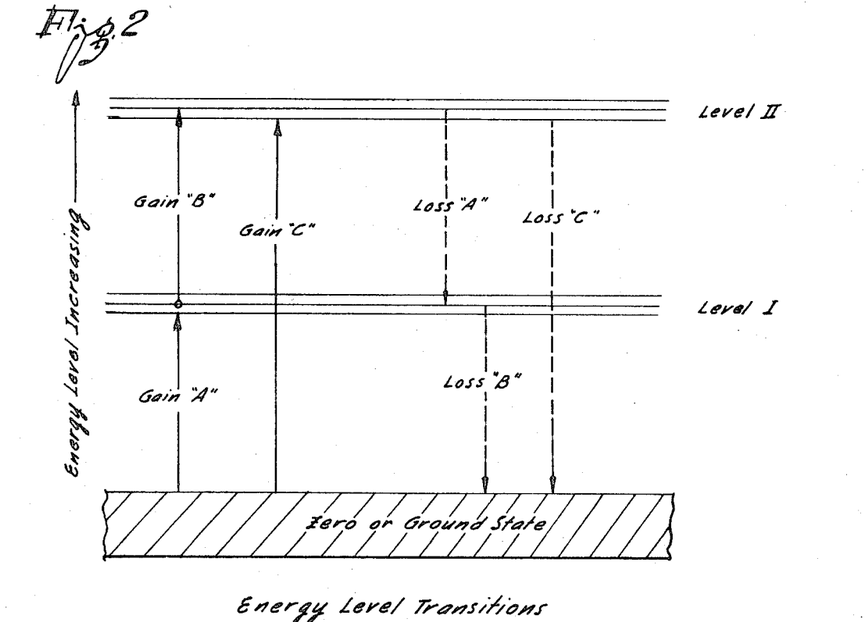
FIG. 2 is a chart indicating the energy level transitions which may occur in a typical laser.

Now that a basic device has been described, the theory of lasers will be considered to the next level of depth in connection with the chart of FIG. 2. In this figure, the vertical direction represents energy levels, with the ground state appearing at the bottom of the diagram, and Level I and Level II appearing at successive higher elevations. The Levels I and II are sometimes referred to as "energy bands." Because of the restricted nature of the possible energy states, only a certain specific set of transitions between energy bands and between or from one energy band to the ground level are possible. These possible transitions are designated by the letters A, B and C. Atoms may be raised in energy level by applied energy, and they may then lose the energy and thus descend by steps to the so-called "zero" or ground state. The gain of energy may be accomplished in a number of ways, by heating, by collision of moving particles, or by radiation from various sources. When an atom passes from a higher to a lower energy level, an emission normally occurs at a characteristic wavelength or frequency which is determined by the difference in energy.

In the case of a solid state laser employing a chromium-doped aluminum oxide, or a pink ruby, atoms may be raised to Levels I and II by radiation with green light. Following the upward transition to Levels I and II, the atoms will fall back to the lower energy state. Level I, the intermediate level, is known as a metastable state. In the transition from Level I to the ground state (designated loss B), red colored light is emitted. This transition may be stimulated by the impingement of red light of the identical frequency, derived, for example, from another transition.

The stimulation action is important and a particular refinement of this phenomenon makes possible the laser or maser action. It is the remarkable property that the emission or radiation from a stimulated metastable conditioned atom reinforces the stimulus from another source in exact frequency and phase. Thus, in the body of a crystal having a relatively large number of energized atoms a cascading effect will be observed, in that a coherent signal of increasing amplitude will occur. Thus, each transition will trigger more than one additional transition and this reaction may sweep through the entire crystal until all of the energized atoms have been triggered from the metastable level to the ground state. For continuous operation in amplification applications, input "pumping" energy is continuously supplied to maintain a high concentration of atoms in the desired excited state.

Figure 3:
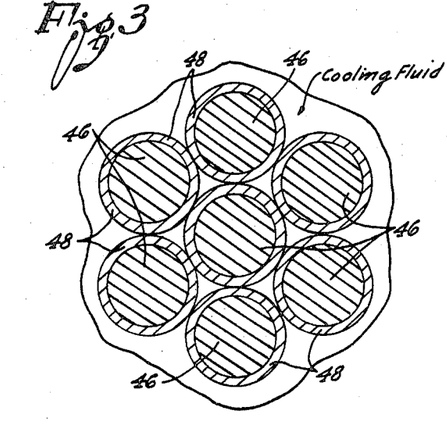
FIGS. 3 and 4 are diagrams indicating possible arrangements of the individual fibers in the laser of FIG. 1.
Figure 4:
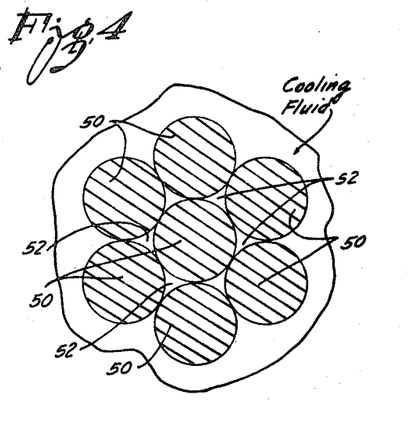

Returning to the detailed embodiments of the invention, FIGS. 3 and 4 are detailed cross sectional views of two alternative forms of the fiber optic bundle 28 of FIG. 1. In FIG. 3 the actual fiber optic elements 46 shown with heavy cross section lines are coated with individual layers 48. The index of refraction of the pink ruby fibers 46 may be approximately 1.78 whereas that of the enclosing layer (glass or other transparent material), may be approximately 1.52. This difference of refractive index will produce total internal refraction and light traveling longitudinally through the fibers 46. However, light traveling in a direction perpendicular to the axis of fibers 46 will pass through the coatings 48 to the adjacent ruby fibers 46. This crosscoupling will provide the desired coherency in light across the entire rod 28.

A balance must be provided between intercoupling to obtain coherency and the increased spacing which will tend to produce the desired directivity. In the arrangement of FIG. 4, the fibers 50 are uncoated and therefore are more closely coupled with one another. They will, however, have space between one another and will not be in actual contact throughout their length so that coolant may flow into the interstitial spaces 52.

Figure 5:
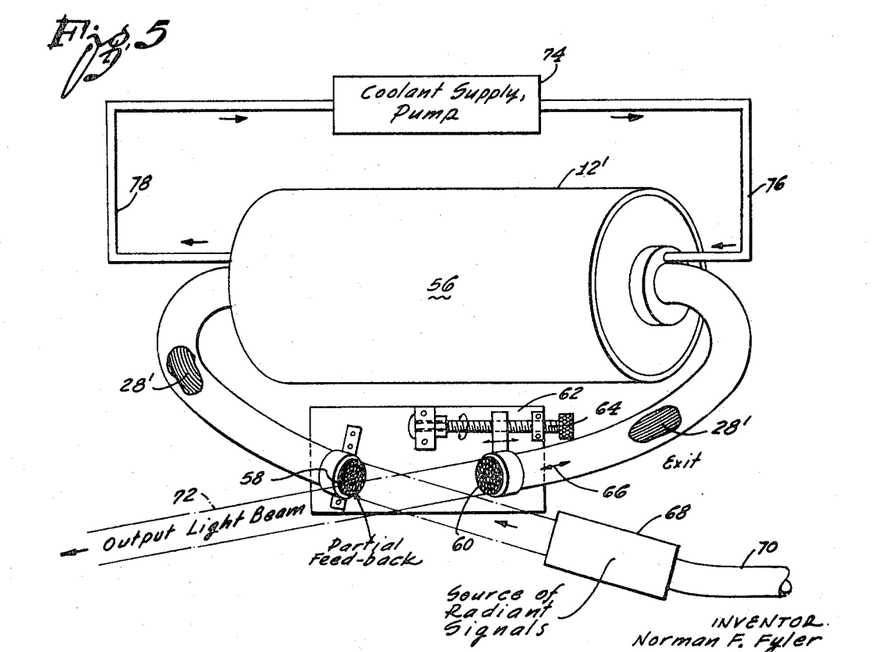
FIG. 5 is an embodiment of the invention in which a reentrant fiber optic structure is employed.

In the reentrant fiber optic system of FIG. 5, the unit 56 corresponds substantially to that of FIG. 1 and includes the outer casing 12'. The device of FIG. 5, however, includes a number of features not shown in FIG. 1. From one standpoint it may be considered to constitute a central active laser element, and two fiber optic cables. In fact, however, the ruby fiber optic cable 28' extends outwardly from both ends of the main unit 56 and terminates at ends 58 and 60. The output from the end 60 is directed to impinge partially on the end 58 of the fiber optic cable 28'. In this way, feedback may be secured and a circulating regenerative chain of transitions may be induced. In order to change the length of the complete light path circulating through the cable 28' and continuing between the ends 58 and 60, an adjusting mechanism 62 is provided. Actually, the waves initiated in the cable 28' should be precisely in step with those recirculated through it from output end 60. A circulating cumulative breakdown should therefore sweep through the chamber 56 and the light should recirculate externally to the vacuum tube unit 56. Exact phase lock may be provided by the fine adjustment of position of the end 60 through the use of screw 64. As the screw 64 is adjusted, end 60 is moved forward or back, as indicated by the arrow 66.

External light from a source 68, for example, may be applied to the input end 58 of the fiber optic cable 28', either in addition to or separate from the feedback signals. The signals from source 68 may, for example, be derived from a communication channel indicated schematically at 70 in FIG. 5. With the input light signals triggering additional transitions in the laser unit 56, the output light beam 72 from the end 60 constitutes an amplified version of the input radiant signals from source 68.

A source of coolant 74 may be connected by suitable conduits 76 and 78 to the inner portion of the vacuum tube unit 56. With reference to FIG. 1 the coolant would flow between the cylinder 24 and the fiber optic bundle 28, and also through the interstitial spaces of the bundle 28.

Before proceeding to consider other embodiments of the invention, it is useful to restate a number of advantages of the laser structures discussed above. Initially, the use of very thin fibers in the fiber optic configuration avoids diffusion of light, and crystalline imperfections may be inspected and removed in the assembly process. The fiber optic configuration may also provide high optical directivity and tends to attenuate undesired extraneous light. The fiber optic structure also provides flexibility to produce a desired exit pupil optical configuration and to provide feedback through reentrant configurations. The fiber construction of the active laser element also permits ready access for coolant fluids, and thus permits high duty factors, or continuous operation. The cathode ray tube light source is particularly useful in a laser environment in view of the need for matching the spectral light output of the source with the required input spectral excitation of the laser element. The pulses may have extremely short rise times, because the unit is a hard or high vacuum tube. The location of the anode toward the laser structure permits conjoint cooling of the laser element and the anode by fluid flow through a single channel.

Figure 6:
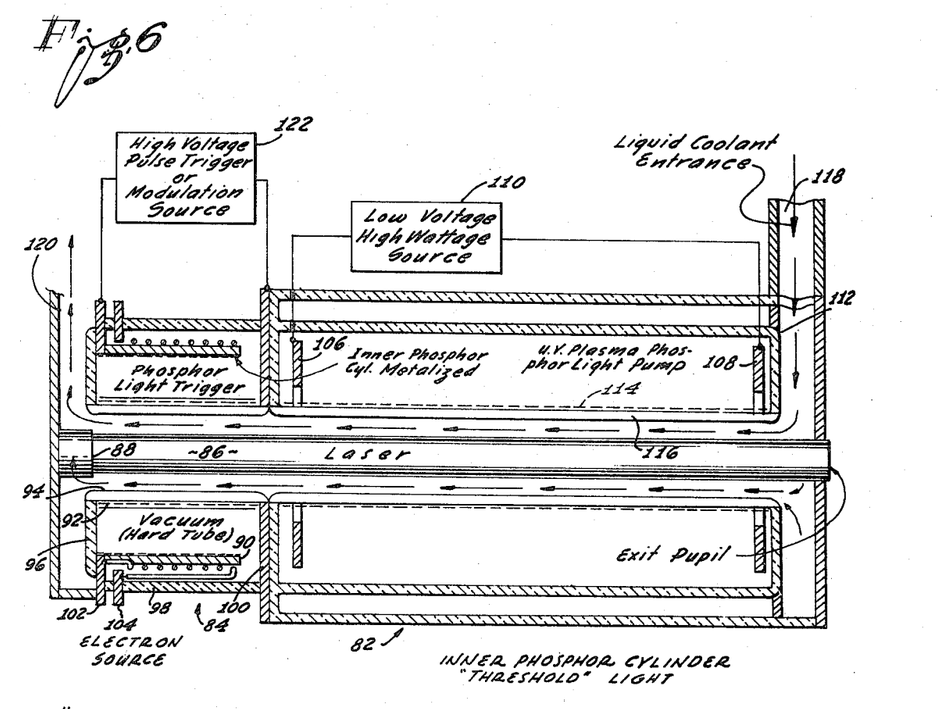
FIG. 6 shows an embodiment of the invention in which the laser apparatus is divided into a gas plasma energized section and a vacuum or "hard" tube energized section.

FIG. 6 shows a laser apparatus in accordance with the invention which includes two distinct sections. This apparatus essentially includes a gas energized section 82 shown at the right in FIG. 6 and the vacuum tube section 84 which appears at the left. As in the other geometries proposed in the present specification, the laser rod 86 is centrally located and is provided with a reflective surface 88 at one end. Considering the vacuum tube section 84 first, it includes an indirectly heated cathode 90 and an aluminized phosphor coating 92. The envelope includes a transparent glass portion 94 facing the laser rod and silvered glass sections 96 and 98 on two of the other surfaces of the vacuum envelope. The conductive metal wall 100 permits the application of suitable anode potentials to the aluminized phosphor screen 92. Power is supplied to the cathode 90 by electrodes 102 and 104.

The gas plasma section 82 of the laser unit includes electrodes 106 and 108. Mercury vapor at relatively low pressure is maintained in the space enclosing the electrodes 106 and 108. These electrodes are energized from a low voltage, high wattage source 110. The glass walls 112 enclosing the plasma discharge section of the tube are coated with silver or some other light reflecting material to direct all of the radiation from the gas plasma inwardly to the phosphor layer 114 on the inner transparent surface of the wall 116. The phosphor material 114, like the phosphor material 92, is matched to the desired input characteristics of the laser rod 86. However, the phosphor 114 is not aluminized, as such an aluminum coating would tend to reflect light from the gas plasma and prevent full energization of the phosphor layer 114.

When a low-pressure mercury vapor plasma is employed, the light output is principally in the ultraviolet region. Such high frequencies are ideal for energizing many phosphors which emit light in the visible range. Furthermore, ultraviolet light has a high energy content as compared with the longer wave lengths in the visible spectrum. Phosphor materials, on the other hand, may be readily prepared to have the desired spectral distribution to which the laser material is sensitive. It is often desirable to excite gas plasmas by radio frequency energy in the kilocycle range. This may be accomplished either by an external radio frequency source or by forming an oscillator which includes the gas plasma. The output light from a plasma excited by radio frequency signals follows a sine wave function to a first approximation, and does not have the constant high intensity light output which is desired for irradiation of the laser material. Phosphor material, however, normally has a considerable lag or persistence in its output emission. The combination of an ultraviolet gas plasma source and a phosphor material is therefore particularly useful for the purpose of exciting the active atomic or molecular particles of laser material.

Coolant fluid is supplied to the laser unit through channel 118 and is withdrawn from the system via channel 120. The coolant fluid serves several useful purposes: first, as noted above, it maintains the laser material 86 at a relatively low temperature and thus maintains high efficiency. Another useful purpose served by the presence of the coolant fluid is optical in nature. Thus, the index of refraction of solid laser materials is normally relatively high. In the case of ruby material, the index of refraction is approximately 1.7. It is desirable that light directed toward the laser material be absorbed into the body of the laser material. If the space between the laser rod 86 and the surfaces 94 and 116 were merely air, having an index of refraction of 1.0, the sharp discontinuity in indices of refraction at the surface of the laser rod 86 would cause reflection of light away from the surface of the laser material, unless the angle of incidence of the light is very nearly equal to 90 degrees.

According to the well known principles of immersion optics, no such reflections occur when the two media have substantially the same index of refraction. Accordingly, in view of the fact that most fluids have an index of refraction of about 1.5, and some even have indices equal to that of the ruby material, the use of a coolant fluid will significantly increase the amount of light which reaches the laser material from the surfaces 94 and 116.

The coolant fluid is circulated along the laser material and the inside surfaces 94 and 116 of the two sections of the laser unit and therefore prevents overheating of the phosphor as well as the laser material. A suitable heat exchanger and pump (not shown) may be provided for recirculation of the coolant fluid.

In operation, the gas plasma section 82 of the laser unit of FIG. 6 increases the number of molecular or atomic particles in elevated energy states. As indicated by the theory of laser action, a certain critical level of particles in the elevated energy states must be achieved before true coherent laser radiation occurs. The gas discharge section 82 of the laser unit is arranged to provide a density of particles in elevated energy states at a threshold level just below the critical level. When it is desired to produce an output pulse of coherent radiation, the "hard," or vacuum tube section 84 is triggered. The intensity of signals from the hard tube 84 is significantly greater than that from the gas discharge section 82. Accordingly, the pulse applied to the hard tube section 84 by voltage source 122 triggers the laser into coherent radiation action. The hard tube section 84 is located adjacent the reflecting end 88 of the laser material and therefore initiates a wave front from surface 88 traveling down the length of the laser material, sweeping out all of the particles which have been excited by the continuous gas discharge and phosphor layer associated with section 82 of the laser unit.

Figure 7:
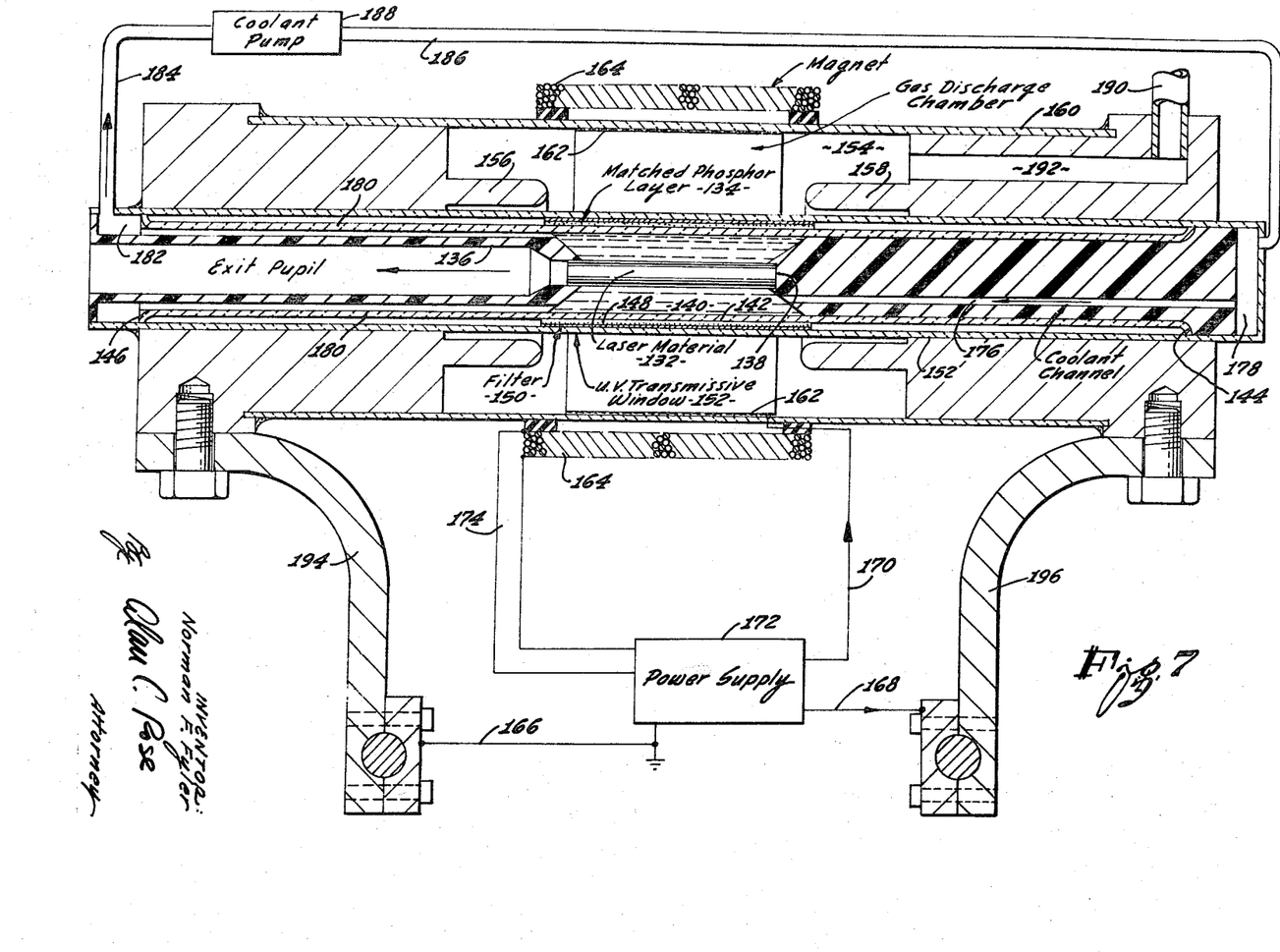
FIG. 7 is another embodiment of the invention, in which the laser material is energized by a phosphor, and the phosphor is excited by a gas plasma.

FIG. 7 represents a laser unit which is solely operated by a gas discharge arrangement and which does not include a hard tube section. In FIG. 7, the laser rod 132 is centrally located and is mounted on the inner ends of an insulating rod 134 and an insulating tube 136. In the arrangement of FIG. 7, the laser material 132 radiates toward the left, and is provided with a reflective surface 138 at its right-hand end. Surrounding the laser material 132 is a chamber 140 which contains a coolant which may have certain specific properties to be discussed in greater detail below. The outer wall of the chamber 140 is a glass or other suitable transparent tube 142. The ends 144 and 146 of the tube 142 may be turned outwardly to protect a phosphor coating 148 on the central outer surface of the transparent tube 142. A suitable filter structure 150 which reflects light radiated by phosphor layer 148 and which transmits ultraviolet light is located on the quartz or Vycor tube 152. In the case of ruby laser material, the phosphor material should provide green irradiation peaked in the vicinity of 5500 Angstrom units; this may be provided by monocrystalline zinc orthosilicate. This type of phosphor is described at p. 86 of a book entitled "Television," second edition, by V. K. Zworykin and G. A. Morton, John Wiley and Sons, Inc., 1954. A suitable type of filter which transmits light of one frequency (ultraviolet in the present case) and reflects light of another frequency (green light), is disclosed in paragraph 14.10 on p. 274 of a book entitled Fundamentals of Optics, by F. A. Jenkins and Harvey E. White, McGraw-Hill Book Co., Inc., 1950.

Surrounding the structure described above is a gas discharge chamber 154. Mercury vapor, with its ultraviolet output spectrum, may advantageously be employed as the gas. The annular gas discharge chamber 154 is bounded at its inner surface by the tube 152, at its two ends by massive copper electrodes 156 and 158 and at its outer surface by the glass tube 160. The gas discharge between electrodes 156 and 158 is maintained at a relatively low pressure to insure distinct spectral lines, and to avoid the broad spectral distribution characteristic of high pressure gas discharges.

Because of the difficulty of obtaining high light intensities from low pressure gas discharges, the light reflective conducting electrode 162 and the magnet 164 are provided. These components increase the length of path traveled by ions in the gas plasma and thus significantly increase the light output from the plasma. With the difference in potential applied to electrodes 156 and 158 along leads 166 and 168, respectively, being equal to a predetermined potential V, the potential applied to electrode 162 on lead 170 may be equal to V/2. Accordingly, positive and negative ions traveling between electrodes 156 and 158 have an outward component of velocity toward the electrode 162. The annular magnet 164 is energized by power supply 172 along leads 174 to provide an axial magnetic field. This axial magnetic field produces a helical path for the charged particles flowing between electrodes 156 and 158, as a result of the radial components of their trajectories. More generally, other arrangements and geometries may be provided to increase the path length of the charged particles in the discharge through the use of crossed magnetic and electric fields. This designation, "crossed magnetic and electric fields," merely requires that some component of the electric field be perpendicular to that of the magnetic field, so that the magnetic field can act on the charged particles which provide a current flowing transverse to the direction of the magnetic field.

The high temperature insulating rod 134 is provided with several longitudinal coolant channels 176 which extend from a coolant chamber 178 to the space 140 surrounding the laser. The tube 136 which surrounds the exit pupil of the laser unit is provided with a number of peripheral grooves 180 for the flow of coolant material from chamber 140 to an annular output coolant chamber 182. The coolant is recirculated through pipes 184 and 186 and coolant pump 188 to the input coolant chamber 178.

The tube 190 and the passageway 192 through electrode 158 are provided to give access to the gas discharge chamber 154. Tube 190 may be employed, for example, in removing air from the gas discharge chamber 154. Relatively massive input connections 194 and 196 are provided for supplying high levels of current at a low voltage level to the electrodes 156 and 158.

In operation, when the gas plasma is energized, the phosphor layer 148 is irradiated with ultraviolet light, through the special filter 150. The phosphor then provides green output light matching the input spectral distribution required by the ruby laser element 132. Upon full irradiation of the laser material, coherent output radiation in the red frequency band is produced.

Figure 8:
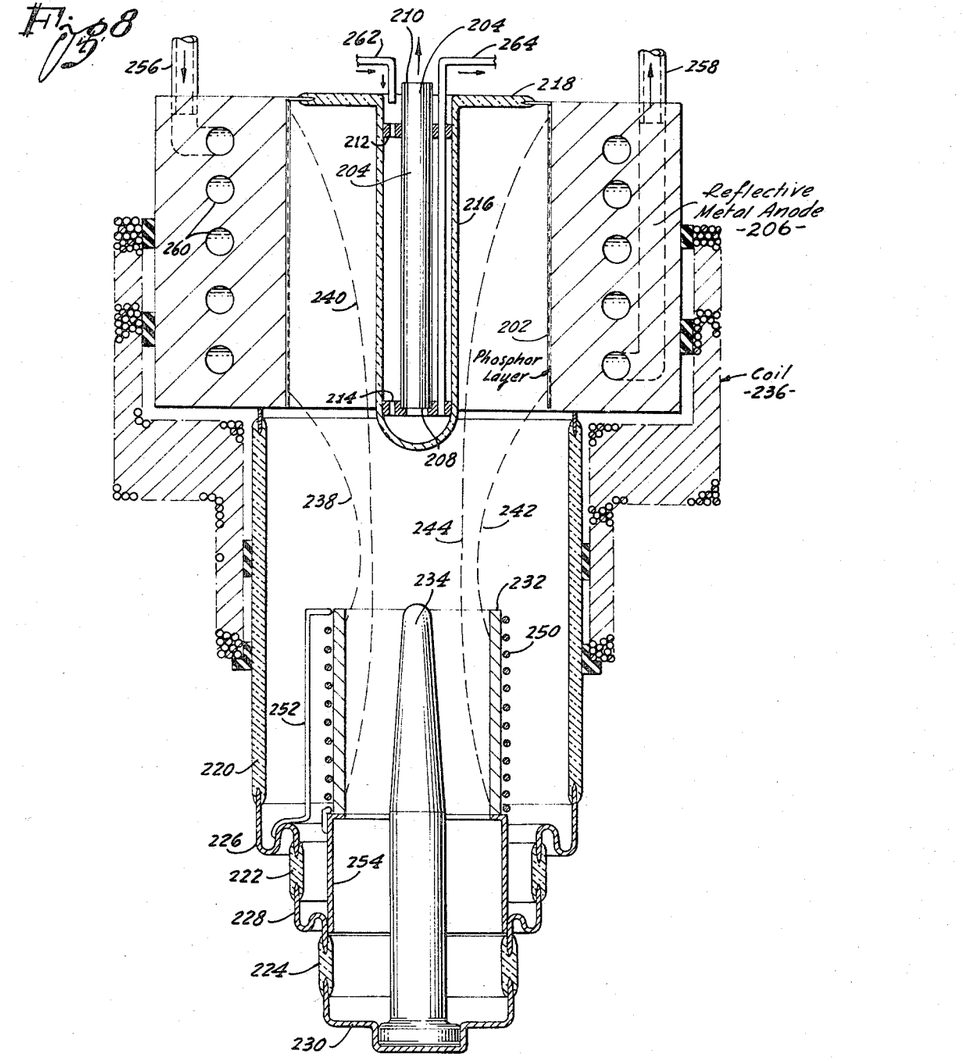
FIG. 8 shows an alternative arrangement in which phosphor material is energized by an electron injection arrangement.

FIG. 8 shows another embodiment of the invention in which phosphor material 202 is employed to provide laser excitation. In previous embodiments of the invention shown in the present drawings, the phosphor material has been energized from one side and has radiated from its opposite surface. This type of construction presents certain problems in the fabrication of a phosphor layer having the proper critical thickness, and in the uniform irradiation of the phosphor material so that it will radiate from its other surface toward the laser material. These design problems are eliminated in accordance with the arrangement of FIG. 8 in which the phosphor surface 202 is irradiated from the inside and also radiates inwardly toward the central laser rod 204.

The phosphor layer 202 is mounted on a heavy metal anode 206 made of reflective conducting material. Aluminum, platinum, or other highly reflective metals may be employed. When these metals are used, any light which might otherwise be directed outwardly from the layer 202 is reflected inwardly toward the laser rod 204.

As in the case of other embodiments of the invention, one end 208 of the laser rod 204 is provided with a reflective metal coating. Coherent light is radiated from the upper end 210 of the laser rod 204.

The laser rod is mounted on apertured insulating rings 212 and 214 within a closed tube of glass 216 which resembles a test tube. The tube 216 forms part of the envelope for the vacuum tube assembly. The remainder of the assembly includes the annular glass wall 218 sealed to the tube 216, the block 206, additional glass cylinders 220, 222 and 224. The sheet metal conductive elements 226, 228 and 230 complete the evacuated envelope.

The vacuum tube structure is of the electron injection type as disclosed in patent application Ser. No. 98,698, filed Mar. 27, 1961, and entitled "High Voltage Electron Discharge Device." It is also similar in certain respects to the injection arrangement disclosed in J. F. Hull Patent No. 2,632,130, granted Mar. 17, 1953. The electron injection arrangement shown in FIG. 8 includes a cylindrical cathode 232, an accelerating electrode 234, and an annular coil 236 extending around the center of the evacuated envelope. The magnetic field of the coil 236 extends axially through the laser unit of FIG. 8 and fringes outwardly as indicated generally by the dotted lines 238, 240, 242 and 244. The accelerating electrode 234 is at a positive potential with respect to the cathode 232, but is maintained at a lower potential than the anode block 206. Accordingly, electrons from the cathode 232 are initially attracted toward the positively-charged accelerating electrode 234. The coil 236, however, has the effect of deflecting the electrons into helical trajectories which are generally coaxial with the tube structure. As a result of these helical paths, the electrons do not impinge on the electrode 234 but are directed axially toward the more positively-charged anode in helical trajectories generally following dashed lines 238, 240, 242 and 244.

Considering other details of the structure of FIG. 8, the electrical connections to the resistance coil 250 are made by the lead 252 and sleeve 254. These conductive elements connect to the sheet metal rings 226 and 228, forming part of the vacuum tube envelope. Electrical connection to the coil 250 may be made by applying an appropriate voltage across these conductive members 226 and 228. The accelerating electrode voltage may be applied to the conductive member 230 at the lower end of the tube structure as shown in FIG. 8.

Both the anode block 206 and the laser element 204 may be specially cooled. Coolant for the anode may be provided by the tubes 256 and 258 which pass cooling liquid such as water through the holes 260 in the anode block. In accordance with conventional practice, the cooling liquid may be passed through a coil of many feet of electrically insulated rubber tubing to provide electrical isolation for the anode block 206. Cooling for the laser element 204 is provided by tubes 262 and 264, which circulate fluid in the hollow space around the laser material. The liquid may be of the form described elsewhere in this specification.

In operation, the tube may be pulsed to the energized state by the application of suitable potentials to the accelerating and anode electrodes. The phosphor layer 202 is then energized by impinging electrons, and irradiates the laser element 204. When a suitable high level of radiation is established, the laser rod 204 units coherent radiation from its exit pupil 210.

Figure 9:
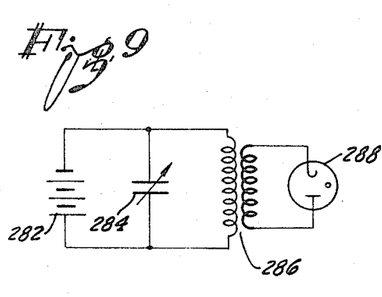
FIGS. 9 and 10 show representative circuit arrangements for energizing the gas plasma employed in other embodiments of the invention.
Figure 10:
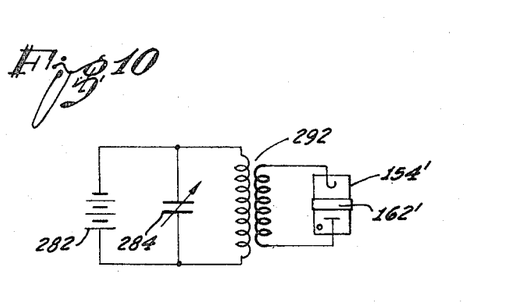

FIG. 9 shows one electrical circuit which may be employed to energize the gas plasmas which are used in several embodiments of the present invention. The circuit of FIG. 9 includes a voltage source 282, a variable capacitor 284, a transformer 286, and the gas plasma chamber indicated schematically at 288. The gas plasma normally has a natural resonant frequency in the kilocycle range. When the tuned circuit including capacitor 284 and the inductance of transformer 286, is tuned to this frequency, the oscillations of the gas plasmas will be reinforced, and pulses of current will flow through the plasma chamber 288 as oscillations are established in the tuned circuit. The tube 288 should be unidirectionally conducting, for the purposes of the circuit of FIG. 9; this may be accomplished by providing points or a heated filament on one of the electrodes in the gas plasma chamber. An alternative arrangement for the circuit of FIG. 7 is shown in FIG. 10. In the arrangement of FIG. 10, the plasma chamber 154' is provided with a central electrode 162' corresponding to electrode 162 of FIG. 7. The electrode 162' is connected to the center tap of the output winding of transformer 292. The other components of the circuit of FIG. 10 correspond precisely to the elements shown in FIG. 9.

In the foregoing discussion, the various figures of the drawings have been described briefly. For completeness, several additional matters should be noted. Initially, with regard to coolant material which may be employed, the coolant may be colored to provide some of the advantages specified above for the special filter 150 of FIG. 7. Thus, the coolant fluid in the chamber 140 adjacent the laser rod 132 in the embodiment of FIG. 7 may have a light transmission characteristic which passes the output radiation from the phosphor layer, and absorbs other light. With this arrangement, undesired random input light is blocked and does not introduce noise into the output of the laser. Properly colored cooling liquid may be particularly useful in embodiments in which the filter 150 is omitted.

The coolant liquid may also have finely divided phosphor material suspended in it, or included in it to form a slurry. By this technique, the phosphor may be located close to the laser material, and problem of heat dissipation from the phosphor is eliminated.

In the preceding description, chromium doped ruby was mentioned as the laser material, and a particular matched phosphor for use with this material was set forth. It was also noted that either electrons or an ultraviolet emitting gas plasma, such as mercury vapor, could be used to energize the phosphor. Other radiation such as X-rays or radioactive particles, including Beta rays may also be employed to activate the phosphor material. Other known laser materials and matched phosphors may also be used. One known laser material, neodymium doped calcium tungstate, is described at p. 1704 of the November 1961 issue of the Proceedings of the Institute of Radio Engineers. A suitable matched phosphor for use with this laser material is calcium tungstate with a stoichiometric excess of tungsten. More generally, the desired frequency of input signals for laser materials is normally well known, and the spectral output characteristics of phosphors are known (see the Zworykin et al. text, supra, for example). A suitable matched phosphor may therefore be provided for any laser material.

It is to be understood that the above-described arrangements are illustrative of the application of the principles of the invention. Numerous other arrangements may be derived by those skilled in the art without departing from the spirit and scope of the invention. Thus, by way of example and not of limitation, the present light source could be used for other high intensity light requirements and could, specifically, be employed with gas maser units. Similarly, the fiber optic laser element could be excited by other light sources than that described in the present application, and fiber optic laser elements may be used in any of the disclosed embodiments of the invention. Other arrangements employing rectangular laser rods could be used, and nonconcentric geometries may be employed. With regard to other possible variations, it is noted that any of a number of coolant liquids may be employed, and that other equivalent components may be employed in place of the particular components or apparatus shown in the present drawings. It is also to be understood that the circuits and the electrode arrangements of FIGS. 9 and 10 are applicable to either of the gas plasma devices of FIGS. 6 or 7, and that arrangements shown in the drawings in connection with one embodiment may generally be used with other embodiments of the invention. Accordingly, it is to be understood that the present invention is to be limited only by the spirit and scope of the appended claims.

What is claimed is:

1. In combination: laser material responsive to radiation of a predetermined spectral distribution for excitation to an elevated energy state and for the discharge of coherent radiation as the material returns to lower energy states; first excitation means for supplying radiation of said predetermined spectral distribution to said laser material to excite said laser material to a threshold level just below the level for the discharge of coherent radiation; and second excitation means to supply radiation in said predetermined spectral distribution to said laser material in an amount sufficient to further excite said laser material from said threshold level to above said threshold level; said first excitation means including a gas plasma discharge means for creating a plasma discharge, phosphor material substantially surrounding a portion of said laser material, said phosphor material responsive to said gas plasma discharge for generating radiant energy, and means permitting coupling of said radiant energy to said laser material; said second excitation means including a cathode ray generator for emitting electrons, a phosphor material substantially surrounding a portion of said laser material responsive to bombardment by said electrons for generating radiant energy, and means permitting coupling of said radiant energy to said laser material.

2. The invention as defined in claim 1, wherein said phosphor material comprises a layer substantially surrounding and spaced from a major portion of said laser material; and said cathode ray generator comprises a cathode surrounding and spaced from said layer for emitting electrons; and means for establishing an electric field between said cathode and said layer for directing electrons to said layer.

3. In combination: Solid state laser material responsive to radiation of a predetermined spectral distribution for excitation to an elevated energy state and for the discharge of coherent radiation as the material returns to lower energy states:

first excitation means for supplying radiation of said predetermined spectral distribution to said laser material to excite said laser material to a threshold level just below the level for the discharge of coherent radiation, said first excitation means comprising; a surface transparent to said spectral distribution of radiation continuously surrounding and spaced from a major portion of said solid state laser material; a coating of phosphor material carried by and substantially covering said transparent surface responsive to ultraviolet radiation for emitting radiation of said predetermined spectral distribution; a reflectve wall continuously surrounding and spaced from said transparent surface for reflecting ultraviolet radiation incident thereon toward said phosphor coating; and an ultraviolet radiation plasma discharge means confined between said transparent surface and said reflective wall for generating ultraviolet radiation incident upon said phosphor coating;

second excitation means for supplying radiation of said predetermined spectral distribution to said laser material in an amount sufficient to excite said laser material from said threshold level to above said threshold level to trigger said laser material into coherent output radiation; said second energization means comprising in an evacuated housing; a surface transparent to said spectral distribution of radiation continuously surrounding and spaced from a portion of said laser material a metallized phosphor coating carried by and substantially covering said surface responsive to electron bombardment for emitting radiation of said predetermined spectral distribution; a cathode spaced from and substantially surrounding said surface for emitting electrons to bombard said metallized phosphor coating; and means for establishing an electric field between said cathode and said metallized phosphor coating for accelerating electrons toward said phosphor coating.

References Cited

UNITED STATES PATENTS

| | | | |
|---|---|---|---|
| 3,172,056 | 3/1965 | Stitch | 331—94.5 |
| 3,059,117 | 10/1962 | Boyle et al. | 330—4 |

OTHER REFERENCES

Wieder: "The Review of Scientific Instruments," November 1959, pp. 995–996.

Schawlow et al.: "Physical Review," Dec. 15, 1958, pp. 1940–1949.

Vogel et al.: "Electronics," Oct. 27, 1961, pp. 39–47.

Snitzer: "Journal of Applied Physics," January 1961, pp. 36–39.

ROY LAKE, *Primary Examiner.*

DARWIN R. HOSTETTER, *Assistant Examiner.*

U.S. Cl. X.R.

330—4.3; 313—109, 197; 315—241; 332—7.51